(12) United States Patent
Sawyer et al.

(10) Patent No.: US 10,513,166 B2
(45) Date of Patent: *Dec. 24, 2019

(54) VEHICLE HVAC SYSTEM WITH AUXILIARY COOLANT LOOP FOR HEATING AND COOLING VEHICLE INTERIOR

(71) Applicant: FORD GLOBAL TECHNOLOGIES, LLC, Dearborn, MI (US)

(72) Inventors: Robert Steven Sawyer, Farmington Hills, MI (US); Manfred Koberstein, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 390 days.

This patent is subject to a terminal disclaimer.

(21) Appl. No.: 14/844,109

(22) Filed: Sep. 3, 2015

(65) Prior Publication Data

US 2017/0066303 A1    Mar. 9, 2017

(51) Int. Cl.
*B60H 1/00* (2006.01)
*B60H 1/32* (2006.01)
*B60H 1/08* (2006.01)

(52) U.S. Cl.
CPC ......... *B60H 1/323* (2013.01); *B60H 1/00064* (2013.01); *B60H 1/00328* (2013.01); *B60H 1/08* (2013.01)

(58) Field of Classification Search
CPC ............ B60H 1/00328; B60H 1/00321; B60H 1/00357; B60H 1/00885; B60H 1/323; B60H 1/00342; B60H 1/08; B60H 2001/002; B60H 1/00064; B60H 1/00492

USPC ............................................. 165/41, 42, 202
See application file for complete search history.

(56) References Cited

U.S. PATENT DOCUMENTS

| | | | | |
|---|---|---|---|---|
| 5,289,698 | A | * | 3/1994 | Garimella .......... B60H 1/00007 62/239 |
| 6,038,877 | A | * | 3/2000 | Peiffer ............... B60H 1/00007 62/244 |
| 6,282,919 | B1 | | 9/2001 | Rockenfeller et al. |
| 6,745,829 | B2 | | 6/2004 | Mehraban et al. |
| 6,823,683 | B2 | | 11/2004 | Amaral et al. |
| 10,272,744 | B2 | * | 4/2019 | Sawyer ............. B60H 1/00064 |
| 2005/0066679 | A1 | | 3/2005 | Boyer et al. |

(Continued)

*Primary Examiner* — Davis D Hwu
(74) *Attorney, Agent, or Firm* — Vichit Chea King & Schickli, PLLC

(57) ABSTRACT

A vehicle includes a heating, ventilation and air conditioning (HVAC) system for heating and cooling a passenger compartment. The HVAC system includes a refrigerant loop and a coolant loop, and an auxiliary coolant loop for heating and cooling at least a portion of the passenger compartment. The auxiliary coolant loop includes a pump for moving a coolant, within the auxiliary coolant loop, through a first heat exchanger coupled to the refrigerant loop via an expansion device, a second heat exchanger positioned within the passenger compartment, and a third heat exchanger coupled to the coolant loop. A flow control valve controls a flow of coolant to the third heat exchanger. The temperature of the coolant within the auxiliary coolant loop is controlled utilizing the flow valve and the pump. The first and third heat exchangers may be in parallel for controlling the movement of coolant there between to control temperature.

15 Claims, 5 Drawing Sheets

(56) References Cited

U.S. PATENT DOCUMENTS

| | | | | |
|---|---|---|---|---|
| 2008/0196877 A1* | 8/2008 | Zeigler | ............. | B60H 1/00907 165/202 |
| 2008/0245503 A1* | 10/2008 | Wilson | ............... | B60H 1/00371 165/42 |
| 2008/0251235 A1* | 10/2008 | Zhou | ................. | B60H 1/00278 165/41 |
| 2012/0297805 A1* | 11/2012 | Kamada | ............ | B60H 1/00278 62/208 |
| 2013/0298849 A1* | 11/2013 | Hallqvist | ........... | B60H 1/00378 123/41.01 |
| 2014/0209269 A1 | 7/2014 | Goenka et al. | | |
| 2016/0023532 A1* | 1/2016 | Gauthier | ............ | B60H 1/00278 62/243 |

\* cited by examiner

VEHICLE HVAC SYSTEM WITH AUXILIARY COOLANT LOOP FOR HEATING AND COOLING VEHICLE INTERIOR

TECHNICAL FIELD

This document relates generally to vehicle heating/cooling systems, and more specifically to a vehicle heating, ventilating, and air conditioning system with an auxiliary coolant loop.

BACKGROUND

It is well known to utilize auxiliary heating, ventilating, and air conditioning (HVAC) systems in vehicles. These auxiliary HVAC systems are typically either a blended air system, which is similar to a forced air HVAC system used as a primary HVAC system, or an air conditioning only or heater only system. These auxiliary HVAC systems are typically positioned within a passenger compartment of the vehicle. More specifically, auxiliary HVAC systems are often positioned either in the rear trim assembly, a center console, under a seat, or otherwise within the compartment.

As with the primary HVAC system, these auxiliary HVAC systems typically have a large footprint or package size considering their positioning within the passenger compartment. In fact, these auxiliary HVAC systems often include some or all of the following: an evaporator core, a heater core, an electric heater, a blower motor and wheel assembly, a blower speed controller, doors, actuators and ducts. Even more, the duct system for the auxiliary HVAC system in larger vehicles, such as sports utility vehicles (SUVs), crossover utility vehicles (CUVs), vans and hybrid vehicles, is typically extensive and extends throughout the passenger compartment in order to distribute conditioned air to varied locations within the compartment (e.g., a second, a third, a fourth, or a fifth row of the vehicle).

While the larger vehicles may provide more cubic feet within the passenger compartment than smaller, more compact, vehicles, the additional space is often utilized for various desired features (e.g., three plus person seating across each row of the passenger compartment). In these scenarios, space within the passenger compartment can become limited. Accommodating this type of seating arrangement or other desired features and a large auxiliary HVAC system, for example, can be difficult and burdensome on vehicle designers. Accordingly, a need exists for an auxiliary HVAC system capable of heating and cooling a passenger compartment, or zones within a passenger compartment, while maintaining a minimal footprint or package size to provide increased flexibility for the vehicle designers.

The auxiliary HVAC system would utilize an auxiliary coolant loop system which is small in size and allows for shorter duct runs for multi-zone conditioning throughout the passenger compartment. Even more, fewer and/or possibly smaller heat exchangers can be utilized limiting the overall package size or footprint of the auxiliary HVAC system. Such an auxiliary HVAC system could also provide spot heating and cooling for lower energy consumption compared to full passenger compartment solutions, and component cooling where components are temperature critical (e.g., a battery pack).

SUMMARY OF THE INVENTION

In accordance with the purposes and benefits described herein, a vehicle is provided. The vehicle may be broadly described as comprising a heating, ventilation and air conditioning (HVAC) system for heating and cooling a passenger compartment, the HVAC system including a refrigerant loop and a coolant loop, and an auxiliary coolant loop for heating and cooling at least a portion of the passenger compartment, the auxiliary coolant loop including a pump for moving a coolant, within the auxiliary coolant loop, through a first heat exchanger coupled to the refrigerant loop, a second heat exchanger positioned within the passenger compartment, and a third heat exchanger coupled to the coolant loop, and a flow control valve for controlling a flow of coolant to the third heat exchanger coupled to the coolant loop, and an expansion device for controlling a flow of refrigerant to the first heat exchanger. The temperature of the coolant within the auxiliary coolant loop is controlled utilizing the flow control valve and the pump.

In one possible embodiment, the second heat exchanger is a coolant to air heat exchanger. In another possible embodiment, the vehicle further includes a blower for moving air through the second heat exchanger and into the passenger compartment. In yet another possible embodiment, the vehicle further includes at least one vent through which the air enters the passenger compartment.

In still another possible embodiment, the first heat exchanger and the third heat exchanger are connected in parallel, the auxiliary coolant loop includes a two way flow control valve for controlling the movement of coolant to the first heat exchanger and the third heat exchanger, and the pump is connected between the second heat exchanger and the two way flow control valve.

In another possible embodiment, the auxiliary coolant loop further includes a fourth heat exchanger positioned within the passenger compartment, a fifth heat exchanger coupled to the coolant loop, and a second flow control valve. Even more, a second temperature of the coolant moving through the fourth heat exchanger within the auxiliary coolant loop is controlled utilizing the second flow control valve and the pump.

In still another possible embodiment, the fourth heat exchanger is a coolant to air heat exchanger, and the vehicle further includes a second blower for moving air through the fourth heat exchanger and into the passenger compartment.

In yet still another possible embodiment, the auxiliary coolant loop further includes a valve for selectively directing the moving coolant through a compartment for housing a component therein in order to regulate a temperature of the component.

In another possible embodiment, the expansion device is utilized to further control the temperature of the coolant within the auxiliary coolant loop in the cooling mode.

In a second possible embodiment, a vehicle includes a passenger compartment having a plurality of zones, a heating, ventilation and air conditioning (HVAC) system for heating and cooling the passenger compartment, the HVAC system including a refrigerant loop and a coolant loop, and an auxiliary coolant loop for heating and cooling the plurality of zones within the passenger compartment, the auxiliary coolant loop including a pump for moving a coolant, within the auxiliary coolant loop, through a first heat exchanger coupled to the refrigerant loop via an electric expansion device, and through a plurality of loops connected in parallel to the pump and the first heat exchanger, each of the plurality of loops includes a second heat exchanger positioned within the passenger compartment, and a third heat exchanger coupled to the coolant loop via a flow control valve. The temperature of the coolant within each of the plurality of loops is controlled utilizing the pump and the flow control valve of each of the plurality of loops.

In another possible embodiment, the expansion device is utilized to further control the temperature of the coolant within the auxiliary coolant loop.

In yet another possible embodiment, each of the plurality of loops is associated with a zone of the plurality of zones.

In still another possible embodiment, each of the second heat exchangers is a coolant to air heat exchanger.

In yet still another possible embodiment, the vehicle further includes a plurality of blowers, wherein each of the plurality of loops includes at least one blower of the plurality of blowers for moving air through the second heat exchanger of the each of the plurality of loops and into the passenger compartment.

In another possible embodiment, the vehicle further includes a plurality of vents, and each of the plurality of vents is associated with at least one of the plurality of blowers, through which the air enters into the passenger compartment.

In yet another possible embodiment, each of the plurality of loops includes one of the plurality of blowers and one of the plurality of vents, and is associated with one zone of the plurality of zones.

In accordance with the purposes and benefits described herein, a method is provided of heating and cooling at least one zone of a passenger compartment in a vehicle having a heating, ventilation and air conditioning (HVAC) system including a refrigerant loop and a coolant loop for heating and cooling the passenger compartment through vents positioned within a front console comprising the steps of: (a) pumping coolant through an auxiliary coolant loop; (b) changing a temperature of the coolant utilizing a first heat exchanger associated with the refrigerant loop via an expansion device and a second heat exchanger associated with the coolant loop; and (c) moving air through a third heat exchanger through which the coolant moves, the third heat exchanger positioned in the passenger compartment, and at least one vent positioned within the at least one zone of the passenger compartment.

In another possible embodiment, the step of changing a temperature of the coolant includes controlling a coolant flow through the second heat exchanger utilizing a flow valve.

In yet another possible embodiment, the first heat exchanger and the third heat exchanger are connected in parallel, the flow valve is a two way valve, and the pump is connected between the second heat exchanger and the flow valve, and further comprising the step of (d) controlling the movement of coolant between the first heat exchanger and the third heat exchanger utilizing the flow valve.

In still another possible embodiment, the method further includes the step of (e) directing at least a portion of the coolant within said auxiliary coolant loop through a compartment for housing a component therein in order to regulate a temperature of the component.

In the following description, there are shown and described several embodiments of a vehicle utilizing an auxiliary coolant loop for controlling a temperature within a passenger compartment and related method of heating and cooling at least one zone of the passenger compartment incorporating same. As it should be realized, the methods and systems are capable of other, different embodiments and their several details are capable of modification in various, obvious aspects all without departing from the vehicles and methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle and method and together with the description serve to explain certain principles thereof. In the drawing figures.

Figure 4:
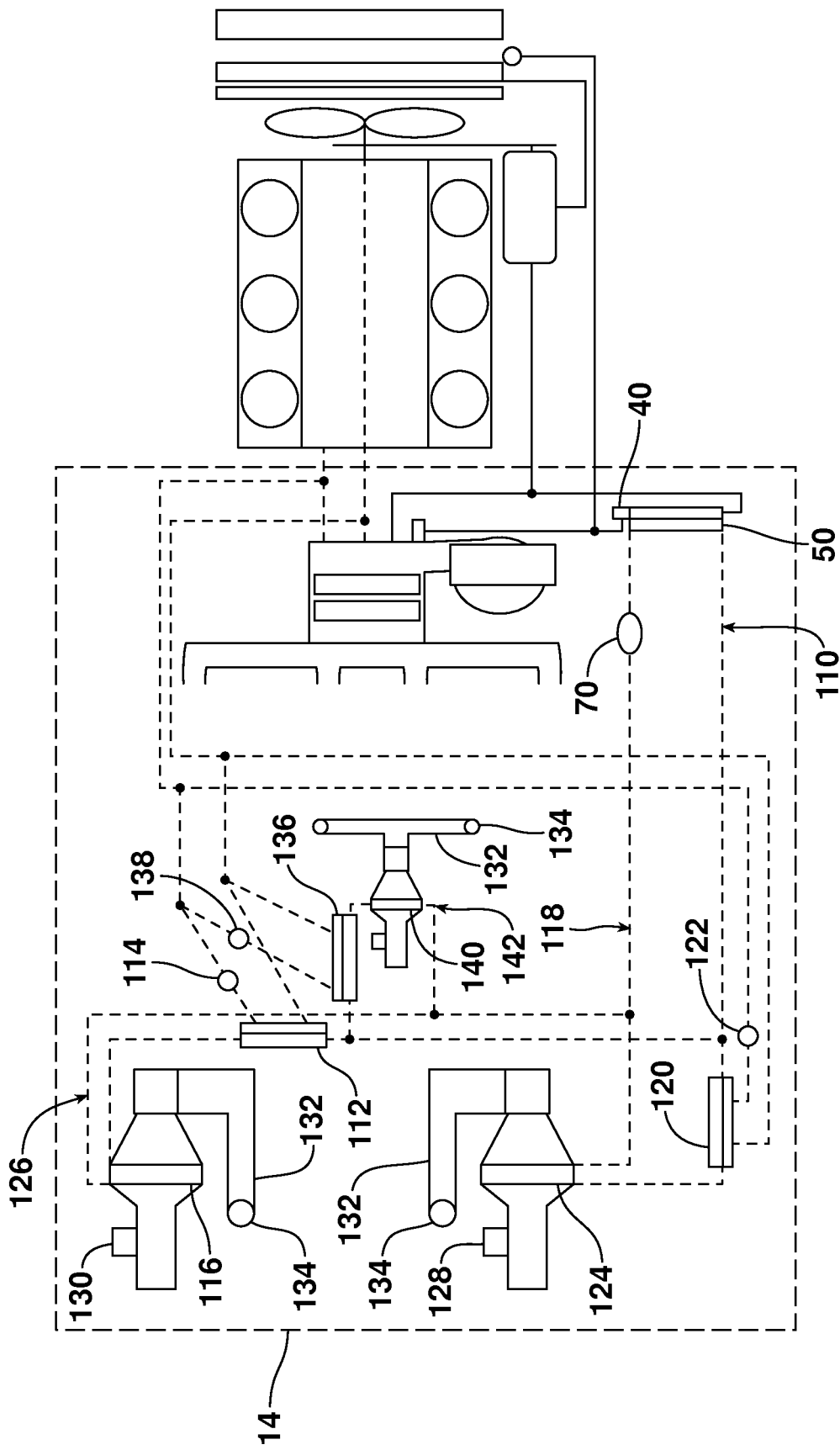
Figure 5:
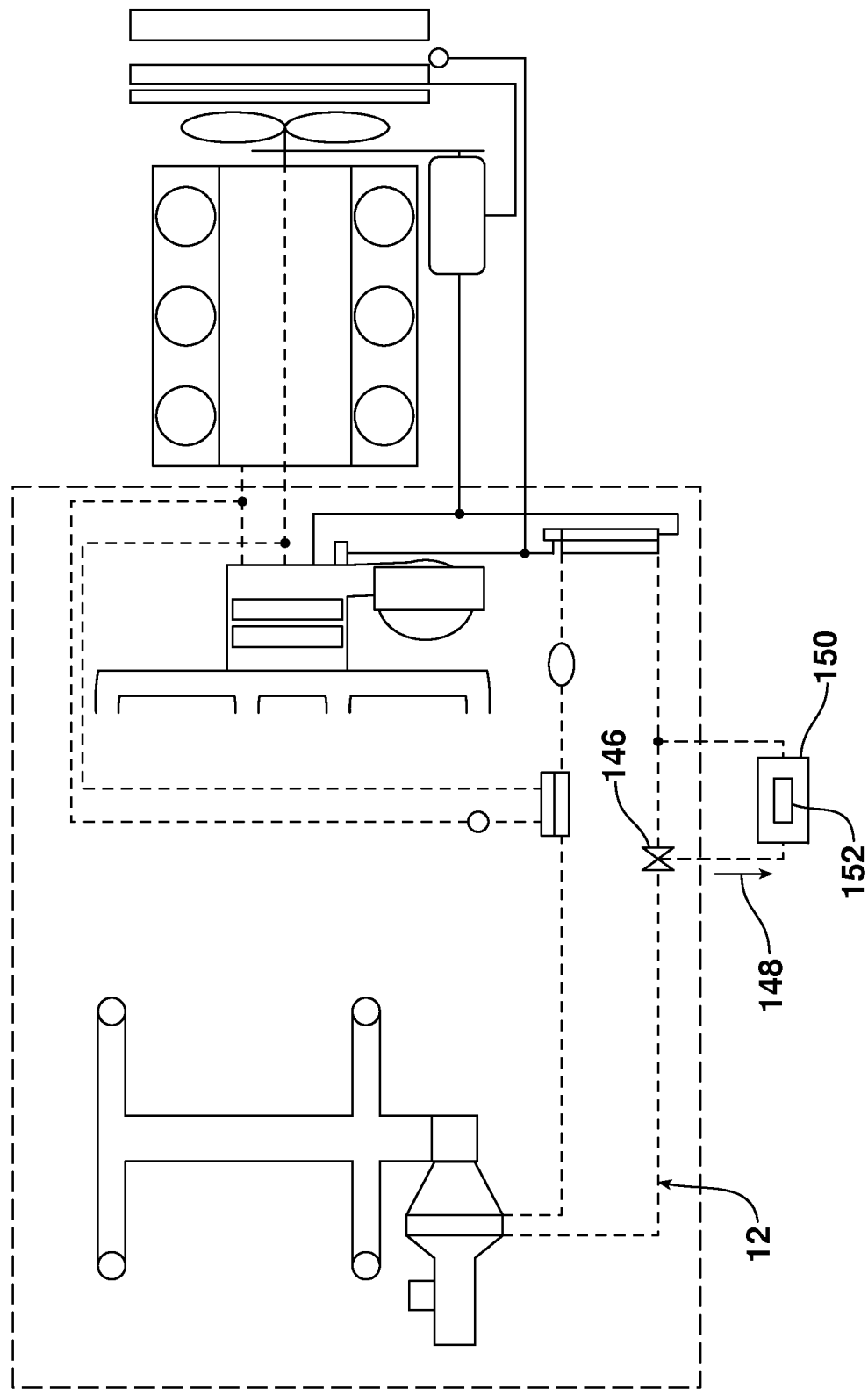

FIG. 4 is a schematic diagram of a vehicle (HVAC) system having an auxiliary coolant loop for heating and/or cooling at least a portion of a passenger compartment with three zone loops for heating and/or cooling three zones auxiliary within the passenger compartment; and FIG. 5 is a schematic diagram of a vehicle (HVAC) system having an auxiliary coolant loop for heating and/or cooling at least a portion of a passenger compartment with a two-way valve for selectively directing coolant through a compartment housing a component for cooling the component.

Reference will now be made in detail to the present preferred embodiments of the vehicle utilizing an auxiliary coolant loop for controlling a temperature within a passenger compartment and related method of heating and cooling at least one zone auxiliary of the passenger compartment, examples of which are illustrated in the accompanying drawing figures, wherein like numerals are used to represent like elements.

DETAILED DESCRIPTION

Figure 1:
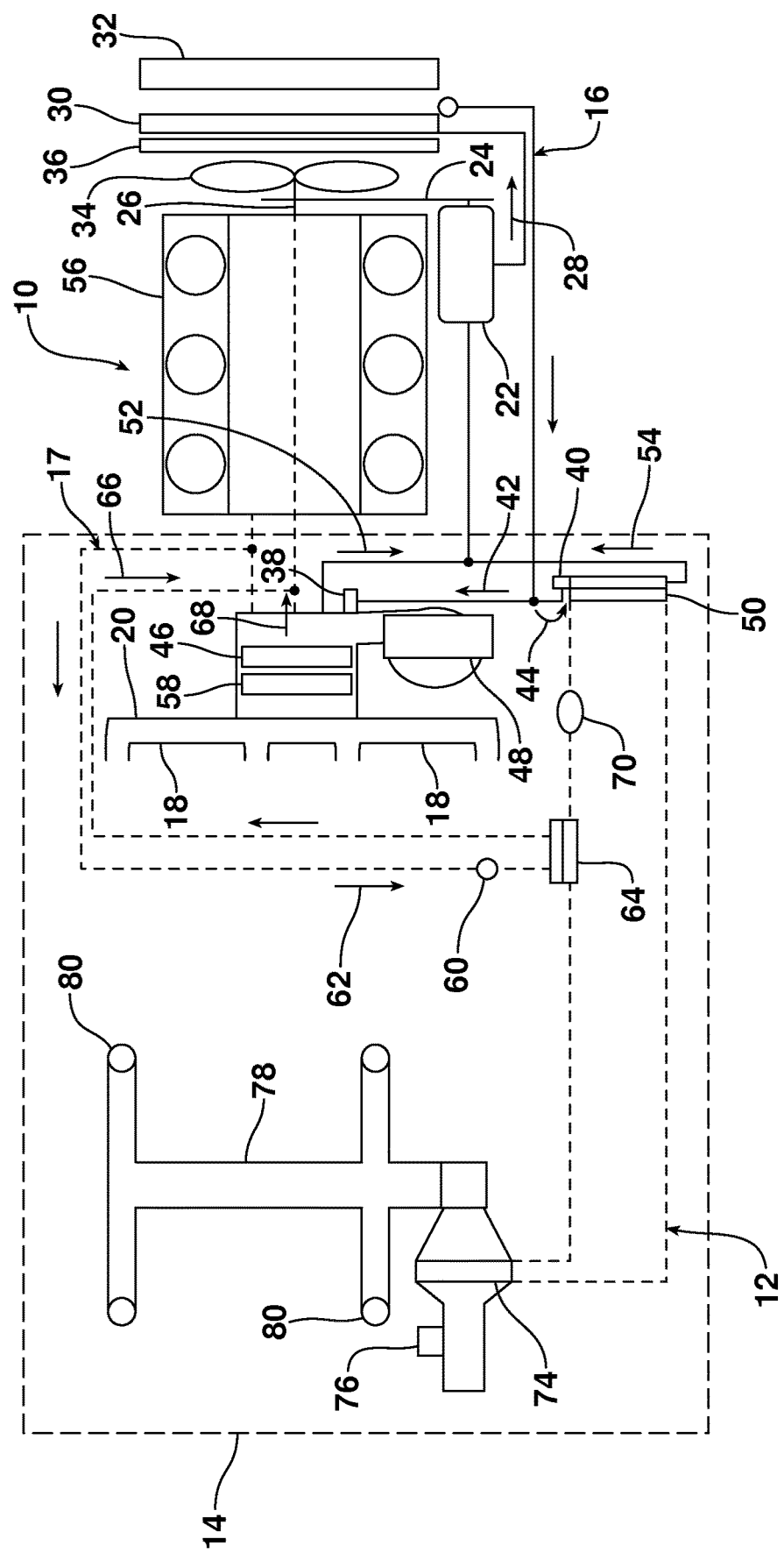
FIG. 1 is a schematic diagram of a vehicle heating, ventilation and air conditioning (HVAC) system having an auxiliary coolant loop for heating and/or cooling at least a portion of a passenger compartment.

Reference is now made to FIG. 1 illustrating a schematic diagram of a typical vehicle heating and cooling system 10 coupled to an auxiliary coolant loop 12 for heating and cooling at least a portion of a passenger compartment 14. The vehicle cooling and heating system 10 includes a main heating, ventilation and air conditioning (HVAC) system including a refrigerant loop 16 and an engine coolant loop 17 (shown in dashed line) for heating and cooling the passenger compartment 14 through vents 18 positioned within an instrument panel 20.

In the described embodiment, the refrigerant loop 16 includes a traditional compressor 22 driven by a compressor belt 24 which in turn is driven by a crankshaft 26 of the vehicle. In operation, the compressor 22 compresses a fluid, which is a refrigerant in the described embodiment, thereby raising a temperature (T) of the refrigerant. The high temperature, high pressure gas refrigerant leaves the compressor 22, as shown by action arrow 28, and flows into a condenser 30.

Broadly speaking, the condenser 30 is positioned in the described embodiment at a front section of an engine compartment and cools the refrigerant. Within the condenser, or outside heat exchanger 30, the high temperature, high pressure gas refrigerant is condensed due primarily to the effect of outside air, and liquefied. The vehicle may include active grill shutters 32 which control an amount of air allowed to pass over the outside heat exchanger 30. As shown, a fan 34 is also utilized in the described embodiment to create and regulate the flow of air through the active grill shutters 32, over the outside heat exchanger 30 and an engine radiator 36.

The high pressure, liquefied refrigerant is then sent to a first (cooling) expansion device 38 and a second (cooling) expansion device 40, as shown by action arrows 42 and 44 respectively. In the first (cooling) expansion device 38, the liquid refrigerant is expanded to become a low-temperature, low-pressure liquid and vapor mixture refrigerant. This low-temperature, low-pressure liquid and vapor mixture refrigerant is supplied to a refrigerant to air heat exchanger, or evaporator, designated numeral 46. Regulation of the flow of refrigerant, or throttling, is used to control the temperature of the refrigerant within the evaporator 46.

In a cooling mode, warm, moist air flowing across the evaporator 46 transfers its heat to the cooler refrigerant within the evaporator. The byproducts are a lowered temperature air and condensation from the air that is routed from the evaporator 46 to an exterior of the vehicle. A blower 48 blows air across the evaporator 46 and through the one or more vents 18 to the passenger compartment 14. This process results in the passenger compartment 14 having a cooler, drier air therein.

In the second (cooling) expansion device 40, the liquid refrigerant is similarly expanded to become a low-temperature, low-pressure liquid and vapor mixture refrigerant. This low-temperature, low-pressure liquid and vapor mixture refrigerant is supplied to a refrigerant to coolant heat exchanger 50 associated with the auxiliary cooling loop 12 where heat is transferred from the coolant within the auxiliary coolant loop to the refrigerant. In the described embodiment, the refrigerant to coolant heat exchanger 50 is positioned within the passenger compartment 14. In alternate embodiments, however, the refrigerant to coolant heat exchanger 50 may be located under the vehicle or within an engine compartment. Also, regulation of the flow of refrigerant, or throttling, is used to control the temperature of refrigerant within the refrigerant to coolant heat exchanger 50.

The low pressure refrigerant exits the refrigerant to coolant heat exchanger 50, as shown by action arrow 54, and recombines with low pressure refrigerant exiting evaporator 46, as shown by action arrow 52, and reenters the compressor 22 where the refrigerant is again compressed and cycled through the system 10.

As indicated above, the system 10 further includes an engine cooling loop 17 including a coolant pump (not shown) that pumps coolant or antifreeze through the engine 56. The coolant draws heat from the engine 56 and routes a portion of the heated coolant through a coolant to air heat exchanger 58 positioned within the vehicle HVAC case. In a heating mode, a blend door (not shown) is used to regulate the flow of air created by the blower 48 allowing air to travel through, or partially through, the coolant to air heat exchanger 58. The portion of the heated coolant flowing through the coolant to air heat exchanger 58 transfers its heat to the air flowing across the coolant to air heat exchanger. The byproducts are a raised temperature air entering the passenger compartment 14 through vents 18 and a lowered temperature coolant.

Another portion of the heated coolant moves through a flow control valve 60, as shown by action arrow 62, to an engine coolant to coolant heat exchanger 64. In the heating mode, the flow control valve 60 allows the heated coolant to enter the engine coolant to coolant heat exchanger 64 and transfer heat to the coolant moving within the auxiliary coolant loop 12 as will be described in more detail below. The portions of now lowered temperature engine coolant flowing from both the coolant to air heat exchanger 58 and the engine coolant to coolant heat exchanger 64, as shown by action arrows 66 and 68 respectively, are recombined before moving back through the engine 56 where the coolant is reheated and cycled through the system 10 as described above.

Within the auxiliary coolant loop 12, a pump 70 moves the coolant through the loop. The pump 70 and the flow control valve 60 work together to control the temperature of the coolant. As described above, the flow control valve 60 regulates an amount of heated engine coolant moving through the engine coolant to coolant heat exchanger 64 and, in the heating mode, allows heated engine coolant to flow through the heat exchanger 64. The coolant in the auxiliary coolant loop 12 absorbs heat as the heated coolant passes through the engine coolant to coolant heat exchanger 64 before being pumped into the refrigerant to coolant heat exchanger 50.

In the heating mode, with the compressor off, no refrigerant is moving through the second (cooling) expansion device 40 or the refrigerant to coolant heat exchanger 50, the coolant moving within the auxiliary coolant loop 12 remains warmed by the transfer of heat within the engine coolant to coolant heat exchanger 64. The warmed coolant then moves to the coolant to air heat exchanger 74 positioned within the passenger compartment 14. A blower 76 creates a flow of air across the coolant to air heat exchanger 74 resulting in a warming of the air flowing across the coolant to air heat exchanger. The warmed air flows into ducting 78 and out the one or more vents 80 positioned within the passenger compartment 14. This process results in at least a portion of the passenger compartment 14 having a warmer air therein.

In the cooling mode, the flow control valve 60 limits an amount of heated engine coolant flowing through the heat exchanger 64. This action limits the absorption of heat by the coolant in the auxiliary coolant loop 12 as the coolant moves through the engine coolant to coolant heat exchanger 64 before being pumped into the refrigerant to coolant heat exchanger 50. The coolant moving within the auxiliary coolant loop 12 and passing through the refrigerant to coolant heat exchanger 50 is cooled utilizing the second (cooling) expansion valve 40 in the cooling mode. The cooled coolant then moves to the coolant to air heat exchanger 74 positioned within the passenger compartment 14.

Again, the blower 76 creates a flow of air across the coolant to air heat exchanger 74. The warm, moist air flowing across the coolant to air heat exchanger 74 transfers its heat to the cooler coolant within the coolant to air heat exchanger. The cooled air flows into the ducting 78 and out the one or more vents 80 positioned within the passenger compartment 14. This process results in at least a portion of the passenger compartment 14 having a cooler, drier air therein. As described above, regulation of the flow of refrigerant, or throttling, is used to control the temperature of refrigerant within the refrigerant to coolant heat exchanger 50. Increasing the flow of refrigerant necessarily lowers the temperature of the coolant within the auxiliary coolant loop 12.

In an alternate embodiment, the flow control valve 60 may be used to control an amount of heated engine coolant flowing through the heat exchanger 64 in combination with the second (cooling) expansion valve 40 which may be used to control an amount of refrigerant flowing through the refrigerant to coolant heat exchanger 50. Together, the flow control valve 60 and second (cooling) expansion valve 40 regulate the temperature of the coolant within the auxiliary coolant loop regardless of operating mode.

Figure 2:
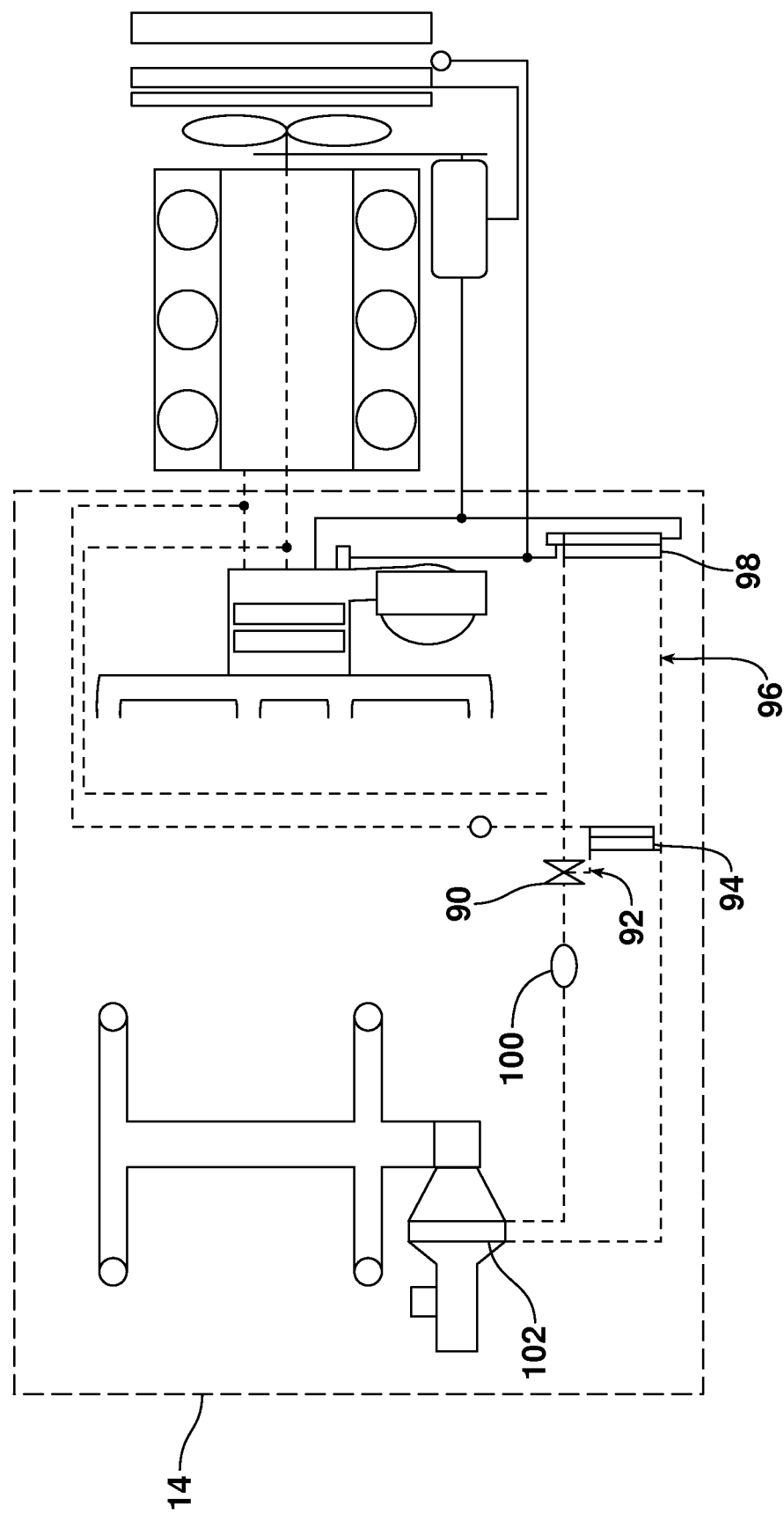
FIG. 2 is a schematic diagram of the vehicle (HVAC) system having an auxiliary coolant loop for heating and/or cooling at least a portion of a passenger compartment with a cooling loop connected in parallel with a heating loop for use individually to provide cooling or heating, or together to provide a blended coolant temperature.

In another alternate embodiment shown in FIG. 2, a two-way flow control valve 90 is included in the auxiliary coolant loop 12. The two-way valve 90 controls movement of the coolant through a heating loop 92 that includes an engine coolant to coolant heat exchanger 94 and a cooling loop 96 that includes a refrigerant to coolant heat exchanger 98. In this embodiment, the heating loop 92 and the cooling loop 96 are connected in parallel and a pump 100 is positioned between a coolant to air heat exchanger 102 and the two-way valve 90. In this manner, the two-way valve 90 can be used to bypass the heating loop 92 in a cooling mode or bypass the cooling loop 96 in a heating mode.

Alternatively, the two-way valve 90 can be utilized to blend coolant from both the heating loop 92 and the cooling loop 96 to control a temperature of the coolant being pumped to the coolant to air heat exchanger 102 and necessarily, a temperature of air in the passenger compartment. Even more, the pump 100 may be positioned between the engine coolant to coolant heat exchanger 94 and the coolant to air heat exchanger 102, or more than one pump could be utilized within the auxiliary coolant loop.

Figure 3:
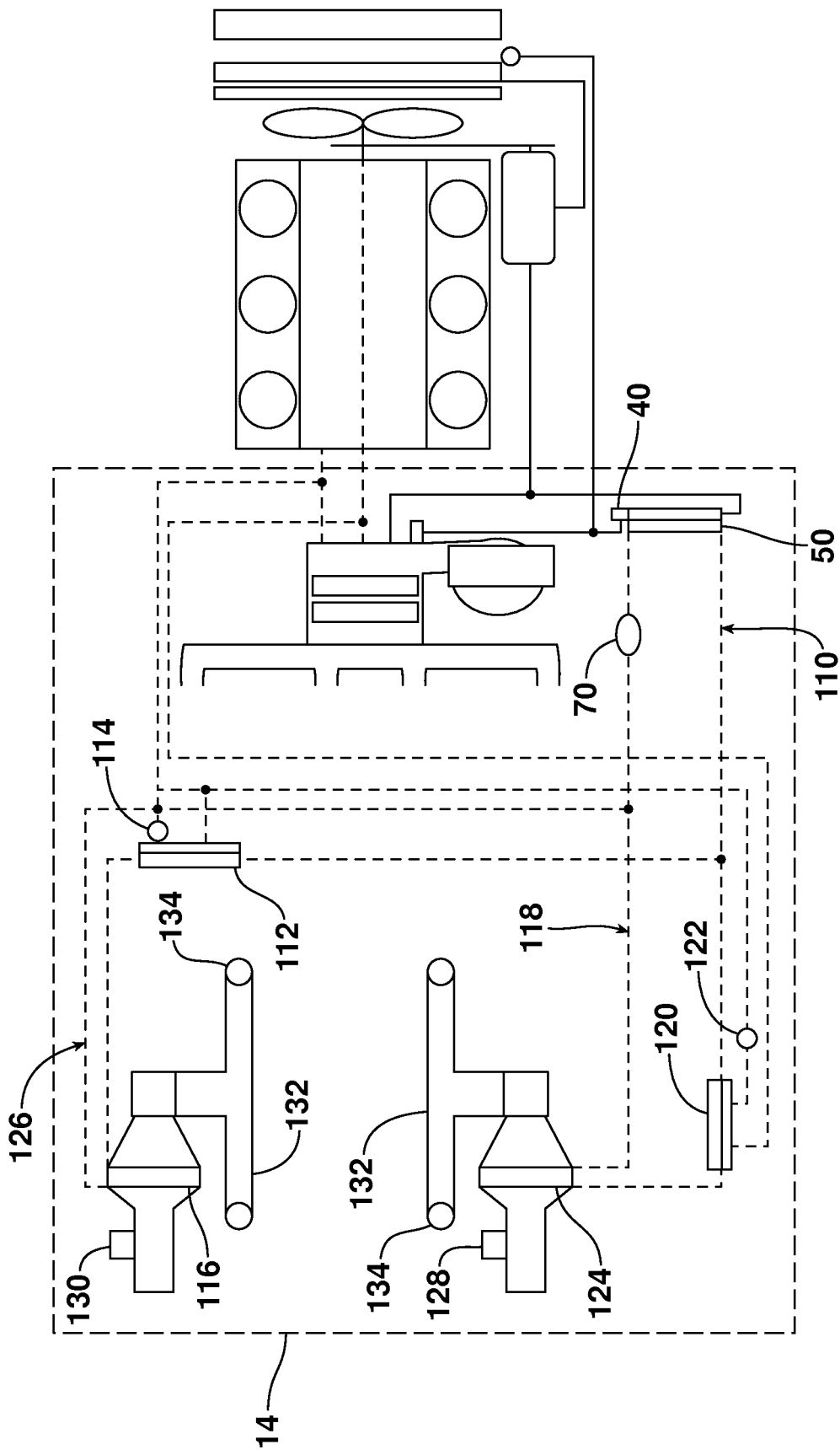
FIG. 3 is a schematic diagram of a vehicle (HVAC) system having an auxiliary coolant loop for heating and/or cooling at least a portion of a passenger compartment with two zone loops for heating and/or cooling two zones auxiliary within the passenger compartment.

In another alternate embodiment shown in FIG. 3, an auxiliary coolant loop 110 includes a second engine coolant to coolant heat exchanger 112, flow control valve 114, and coolant to air heat exchanger 116 in a dual zone configuration. In this configuration, a first zone loop 118 including a first engine coolant to coolant heat exchanger 120, flow control valve 122, and coolant to air heat exchanger 124, is in parallel with a second zone loop 126. The second zone loop 126 includes the second engine coolant to coolant heat exchanger 112, flow control valve 114, and coolant to air heat exchanger 116. This dual loop configuration allows for heating and/or cooling within two zones of a passenger compartment 14.

As described above, a pump 70 moves coolant through a refrigerant to coolant heat exchanger 50. In the cooling mode, the second (cooling) expansion device 40 expands the liquid refrigerant to become a low-temperature, low-pressure liquid and vapor mixture refrigerant. This low-temperature, low-pressure liquid and vapor mixture refrigerant is supplied to the refrigerant to coolant heat exchanger 50 associated with the auxiliary cooling loop 110 where heat is transferred from the coolant within the auxiliary coolant loop to the refrigerant.

In the heating mode, with the compressor off, no refrigerant is moving through the second (cooling) expansion device 40 or the refrigerant to coolant heat exchanger 50, the coolant moving within the auxiliary coolant loop 110 remains warmed by the transfer of heat within the engine coolant to coolant heat exchangers 112 and 120 which is itself controlled by flow control valves 114 and 122. In the cooling mode, for example, the flow control valves 114 and 122 limit an amount of heated engine coolant passing through the engine coolant to coolant heat exchangers 112 and 120 respectively. Since no warmed coolant is moving through the engine coolant to coolant heat exchangers 112 and 120, the coolant moving within the auxiliary coolant loop 110 remains cooled by the transfer of heat to the refrigerant within the second (cooling) expansion device 40.

As described above, a first blower 128 in the dual zone configuration selectively creates a flow of air across the first coolant to air heat exchanger 124 and a second blower 130 selectively creates a flow of air across the second coolant to air heat exchanger 116. The warm, moist air flowing across the coolant to air heat exchangers transfers its heat to the cooler coolant within the coolant to air heat exchangers in the cooling mode. The cooled air flows into ducting 132 and out one or more vents 134 positioned within the passenger compartment 14. This process results in the passenger compartment 14 having a cooler, drier air therein in the cooling mode. In the heating mode, the cool air flowing across the coolant to air heat exchangers absorbs heat from the warmer coolant within the coolant to air heat exchangers and out the ducting 132 into the passenger compartment 14.

Depending on demands of the vehicle occupants, the first zone loop 118 may be utilized to cool a portion of the passenger compartment 14 while the second zone loop 126 may be utilized to warm a different portion of the passenger compartment. In this manner, selective heating and cooling may be provided within the passenger compartment dependent upon the demands of the vehicle occupants.

In still another alternate embodiment shown in FIG. 4, an auxiliary coolant loop 110 includes a third engine coolant to coolant heat exchanger 136, flow control valve 138, and coolant to air heat exchanger 140 in a multi zone configuration. In this configuration, a first zone loop 118 including a first engine coolant to coolant heat exchanger 120, flow control valve 122, and coolant to air heat exchanger 124, is in parallel with a second zone loop 126 including a second engine coolant to coolant heat exchanger 112, flow control valve 114, and coolant to air heat exchanger 116, and a third zone loop 142 including the third engine coolant to coolant heat exchanger 136, flow control valve 138, and coolant to air heat exchanger 140 in a tri-loop configuration. This tri-loop configuration allows for heating and/or cooling within multiple zones of a passenger compartment 14.

As described above, a pump 70 moves coolant through a refrigerant to coolant heat exchanger 50 which expands the liquid refrigerant to become a low-temperature, low-pressure liquid and vapor mixture refrigerant. This low-temperature, low-pressure liquid and vapor mixture refrigerant is supplied to the refrigerant to coolant heat exchanger 50 associated with the auxiliary cooling loop 110 where heat is transferred from the coolant within the auxiliary coolant loop to the refrigerant in the cooling mode. In the heating mode, no refrigerant is moving through the second (cooling) expansion device 40 or the refrigerant to coolant heat exchanger 50 so the coolant moving within the auxiliary coolant loop 110 remains warmed by the transfer of heat within the engine coolant to coolant heat exchangers 112, 120, and 136. These processes are the same in the dual loop and tri-loop embodiments except for the additional parallel loop 142.

Similarly, a third blower selectively creates a flow of air across the third coolant to air heat exchanger 140. The warm, moist air flowing across the coolant to air heat exchanger transfers its heat to the cooler coolant within the coolant to air heat exchanger in the cooling mode. The cooled air flows into ducting 132 and out one or more vents 134 positioned within the passenger compartment 14. This process results in the passenger compartment 14 having a cooler, drier air therein in the cooling mode. In the heating mode, the cool air flowing across the coolant to air heat exchanger 140 absorbs heat from the warmer coolant within the coolant to air heat exchanger and out the ducting 132 and vents 134 into the passenger compartment 14.

In even more alternate embodiments, the auxiliary coolant loop may include one or more additional zone loops to provide individualized heating and/or cooling within a plurality of zones within the passenger compartment. As described above, each additional zone loop may include an additional engine coolant to coolant heat exchanger, flow control valve, and coolant to air heat exchanger. Alternatively, certain loops may share one or more common components (e.g., loops 3 and 4 may share an engine coolant to coolant heat exchanger and a flow control valve while maintaining separate coolant to air heat exchangers). Even more, each zone loop of the plurality of zone loops is configured in parallel with the remaining zone loops. This plurality loop configuration allows for heating and/or cooling within the plurality of zones of the passenger compartment as described above. For example, a passenger in the third row could request warmer air from an associated coolant to air heat exchanger and blower while another passenger in the second row could request no air, or cooler air from another associated coolant to air heat exchanger and blower.

In another alternate embodiment shown in FIG. 5, a two-way valve 146 is added to the auxiliary coolant loop 12 for selectively directing the moving coolant, as shown by action arrow 148, through a compartment 150 for housing a component 152 therein in order to regulate a temperature of the component (e.g., a battery pack). The two-way valve 146 operates to allow the coolant to move normally within the auxiliary coolant loop 12 or to be diverted through the compartment 150 when component cooling is desired. Of course, one or more valves may be added to the auxiliary coolant loop if multiple compartments are utilized within the vehicle.

In summary, numerous benefits result from the vehicle utilizing an auxiliary coolant loop for controlling a temperature within a passenger compartment and related method of heating and cooling at least one zone of the passenger compartment incorporating same as illustrated in this document. The auxiliary coolant loop system provides heating and/or cooling within a passenger compartment or zones within the passenger compartment in a minimum package size. This provides increased flexibility for vehicle designers. The use of an auxiliary coolant loop system also allows for shorter duct runs for multi-zone air conditioning throughout the passenger compartment and the utilization of fewer and/or possibly smaller heat exchangers. Even more, the system allows for spot heating and cooling resulting in lower energy consumption compared to full passenger compartment solutions, and component cooling where components are temperature critical.

The foregoing has been presented for purposes of illustration and description. It is not intended to be exhaustive or to limit the embodiments to the precise form disclosed. For example, the expansion devices in the described embodiment could be electronic expansion devices. Obvious modifications and variations are possible in light of the above teachings. All such modifications and variations are within the scope of the appended claims when interpreted in accordance with the breadth to which they are fairly, legally and equitably entitled.

What is claimed:

1. A vehicle, comprising:
   a passenger compartment;
   a heating, ventilation and air conditioning (HVAC) system including (a) a refrigerant loop having an evaporator, (b) a coolant loop having a first coolant loop heat exchanger and (c) a first blower moving air through said evaporator and said first coolant loop heat exchanger into said passenger compartment;
   an auxiliary coolant loop thermally coupled to said refrigerant loop and said coolant loop, including a first heat exchanger thermally coupled to said refrigerant loop, a second heat exchanger positioned within said passenger compartment, a third heat exchanger thermally coupled to said coolant loop and a pump moving a coolant through said auxiliary coolant loop;
   a flow control valve controlling a flow of coolant within said auxiliary coolant loop to said third heat exchanger; and
   an expansion valve controlling flow of refrigerant within said refrigerant loop to said first heat exchanger;
   wherein a temperature of said coolant within said auxiliary coolant loop is controlled by said flow control valve and said pump.

2. The vehicle of claim 1, wherein said second heat exchanger is a coolant to air heat exchanger.

3. The vehicle of claim 2, further comprising a second blower for moving air through said second heat exchanger and into said passenger compartment.

4. The vehicle of claim 3, further comprising at least one vent through which the air enters said passenger compartment.

5. The vehicle of claim 1, wherein said auxiliary coolant loop further includes a valve for selectively directing said coolant moving within said auxiliary coolant loop through a compartment for housing a component therein in order to regulate a temperature of the component.

6. The vehicle of claim 1, wherein said expansion valve is utilized to further control the temperature of said coolant within said auxiliary coolant loop in a cooling mode by supplying refrigerant to said first heat exchanger.

7. The vehicle of claim 1, wherein said evaporator is a refrigerant to air heat exchanger.

8. The vehicle of claim 7, wherein said second heat exchanger is a coolant to air heat exchanger.

9. The vehicle of claim 8, further comprising a second blower for moving air through said second heat exchanger and into said passenger compartment.

10. The vehicle of claim 9, further comprising at least one vent through which the air enters said passenger compartment.

11. The vehicle of claim 1, wherein said first coolant loop heat exchanger is a coolant to air heat exchanger.

12. The vehicle of claim 11, wherein said second heat exchanger is a coolant to air heat exchanger.

13. The vehicle of claim 12, further comprising a second blower for moving air through said second heat exchanger and into said passenger compartment.

14. The vehicle of claim 13, further comprising at least one vent through which the air enters said passenger compartment.

15. A vehicle, comprising:
    a passenger compartment;
    a heating, ventilation and air conditioning (HVAC) system including a blower for moving air through (a) a refrigerant to air heat exchanger thermally coupled to a refrigerant loop and (b) a first coolant to air heat exchanger thermally coupled to a coolant loop for heating and cooling the passenger compartment of the vehicle; and an auxiliary coolant loop including a first heat exchanger thermally coupled to said refrigerant loop, a second heat exchanger, a third heat exchanger thermally coupled to said coolant loop and a pump moving a coolant through said auxiliary coolant loop wherein said second heat exchanger is a second coolant to air heat exchanger conditioning air of said passenger compartment;

a flow control valve for controlling a flow of coolant within said auxiliary coolant loop, to said third heat exchanger, and an expansion valve for controlling a flow of refrigerant within said refrigerant loop, to said first heat exchanger.

\* \* \* \* \*